US010703324B2

(12) United States Patent
Hill et al.

(10) Patent No.: US 10,703,324 B2
(45) Date of Patent: Jul. 7, 2020

(54) VEHICLE AIRBAG

(71) Applicant: Ford Global Technologies, LLC, Dearborn, MI (US)

(72) Inventors: Anna Miller Hill, Belleville, MI (US); Paul Alan Forgette, Brownstown, MI (US); Jeffrey Charles Paddock, Dearborn Heights, MI (US); Benjamin Yilma, Canton, MI (US); Robert Ralph Armitage, Howell, MI (US); Brian Robert Spahn, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/117,429

(22) Filed: Aug. 30, 2018

(65) Prior Publication Data

US 2020/0070763 A1 Mar. 5, 2020

(51) Int. Cl.

*B60R 21/232* (2011.01)
*B60R 21/214* (2011.01)
*B60R 21/233* (2006.01)
*B60R 21/231* (2011.01)

(52) U.S. Cl.

CPC .......... *B60R 21/232* (2013.01); *B60R 21/214* (2013.01); *B60R 21/233* (2013.01); *B60R 2021/23107* (2013.01); *B60R 2021/23153* (2013.01); *B60R 2021/23161* (2013.01); *B60R 2021/23308* (2013.01)

(58) Field of Classification Search

CPC ... B60R 21/232; B60R 21/233; B60R 21/214; B60R 2021/23107; B60R 2021/23161; B60R 2021/23153; B60R 2021/23308

See application file for complete search history.

(56) References Cited

U.S. PATENT DOCUMENTS

| | | | | |
|---|---|---|---|---|
| 3,894,750 | A | 7/1975 | Eckels | |
| 9,789,840 | B2 | 10/2017 | Farooq et al. | |
| 2002/0167202 | A1* | 11/2002 | Pfalzgraf | B60J 7/0015 296/214 |
| 2005/0242550 | A1* | 11/2005 | MacNee | B60J 7/1252 280/730.2 |
| 2009/0174174 | A1 | 7/2009 | McCoy | |
| 2017/0015269 | A1* | 1/2017 | Min | B60R 21/214 |
| 2018/0009348 | A1 | 1/2018 | Deshmukh | |

FOREIGN PATENT DOCUMENTS

| | | | |
|---|---|---|---|
| JP | 6056695 | B2 | 1/2017 |
| WO | 200144026 | A1 | 6/2001 |

* cited by examiner

*Primary Examiner* — Drew J Brown

(74) *Attorney, Agent, or Firm* — Frank A. MacKenzie; Bejin Bieneman PLC

(57) ABSTRACT

A vehicle includes a floor and a seat supported by the floor. The vehicle includes a roof. The vehicle includes a base supported by the roof and movable relative to the roof. The vehicle includes an airbag supported by the base.

20 Claims, 5 Drawing Sheets

20 26 34 44 42 28 30 32 50 24 22 A1 A2 A3

A3
42
28
30
24
44
50
42
24
22
A1
44
28
30
32
28
34
32
44
44
28
30
32
24
50
24
26
20
A2

VEHICLE AIRBAG

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
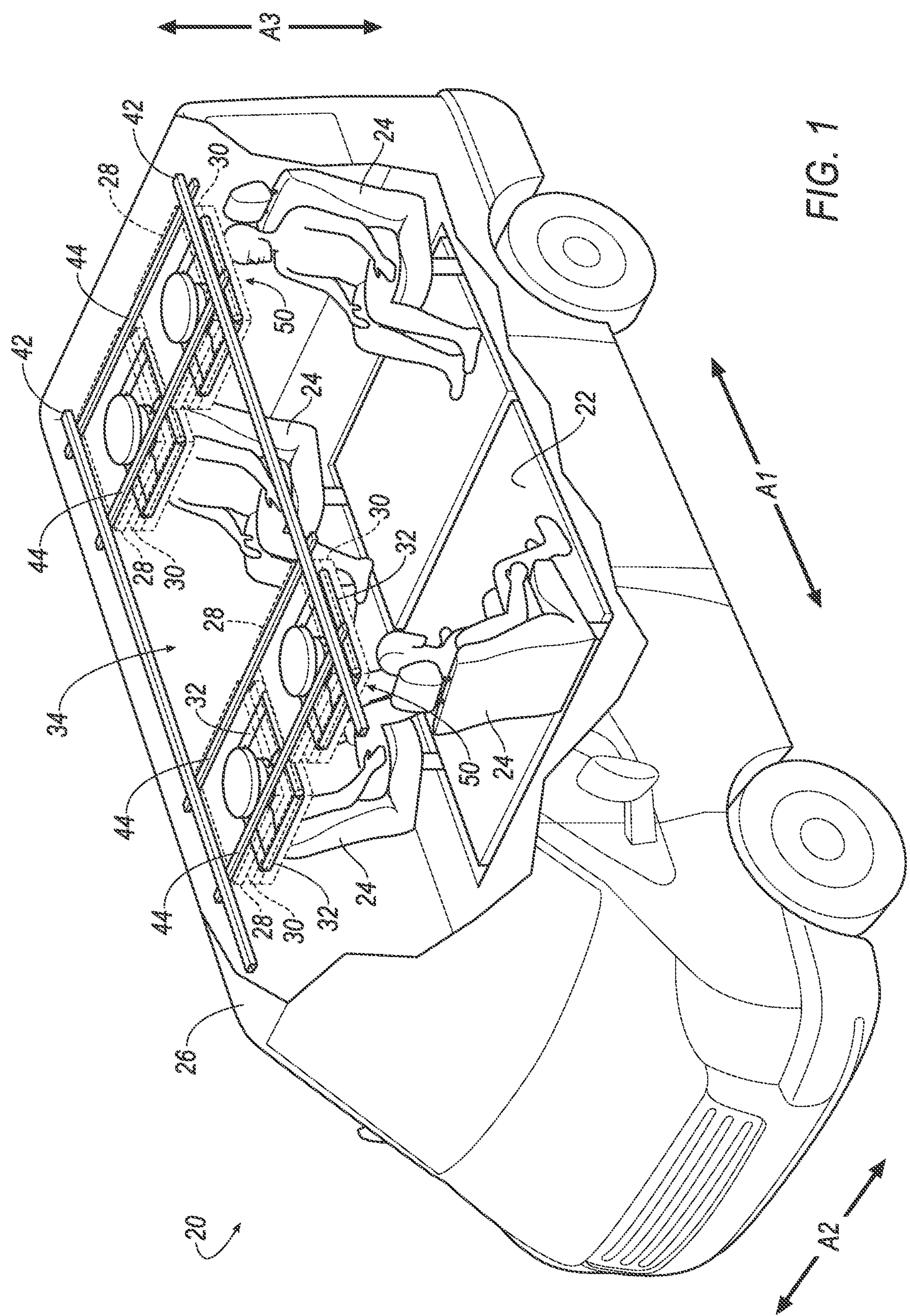
FIG. 1 is a perspective view of a vehicle having airbags in uninflated positions.

A vehicle includes a floor and a seat supported by the floor. The vehicle includes a roof. The vehicle includes a base supported by the roof and movable relative to the roof. The vehicle includes an airbag supported by the base.

The roof may include an exterior panel and a headliner, the airbag between the exterior panel and the headliner in an uninflated position.

The roof may include a track elongated along an axis, the base movable along the track.

The vehicle may include a second base supported by the roof and movable relative to the roof and the base, and a second airbag supported by the second base.

The base may be rotatable relative to the roof.

The base may be translatable relative to the roof.

The base may be movable relative to the roof along a cross-vehicle axis.

The base may be movable relative to the roof along a vehicle-longitudinal axis.

The vehicle may include a second airbag supported by the base.

The airbag may be releasably fixed to the second airbag.

The airbag may be inflatable to an inflated position surrounding the seat.

The airbag in the inflated position may be cylindrical.

The vehicle may include an actuator supported by the roof and designed to move the base.

The vehicle may include an inflator supported by the base.

The vehicle may include a processor and a memory storing instructions executable by the processor to move the base based on at least one of a position of the seat or a position of an occupant of the seat.

The seat may be rotatable relative to the floor and the base may be rotatable relative to the roof.

The vehicle may include a processor and a memory storing instructions executable by the processor to rotate the base based on a rotational position of the seat.

The vehicle may include a motor supported by the roof and designed to rotate the airbag relative to the roof.

The airbag may be inflatable to an inflated position that extends from the roof toward the seat.

The base may be spaced from the seat.

With reference to the Figures, wherein like numerals indicate like parts throughout the several views, a vehicle 20 includes a floor 22 and a seat 24 supported by the floor 22. The vehicle 20 includes a roof 26. The vehicle 20 includes one or more bases 28, 30, e.g., a first base 28 and a second base 30, supported by the roof 26 and movable relative to the roof 26. The vehicle 20 includes one or more airbags 32, 132 supported by the one or more bases 28, 30. The adjectives “first” and “second” are used throughout this document as identifiers and are not intended to signify importance or order.

Moving the base(s) 28, 30 relative to the roof 26 enables the airbag(s) 32, 132 to be positioned relative to the seat 24 to control kinematic of an occupant seated therein, e.g., during a vehicle impact. For example, the base(s) 28, 30 may be moved to correspond to a translational and/or rotational position of the seat 24 relative to the floor 22. As another example, the base(s) 28, 30 may be moved to correspond to a position of the occupant of the seat 24.

The vehicle 20 may be any passenger or commercial automobile such as a car, a truck, a sport utility vehicle, a crossover vehicle, a van, a minivan, a taxi, a bus, etc. The vehicle 20 may define a longitudinal axis A1, e.g., extending between a front and a rear of the vehicle 20. The vehicle 20 may define a cross-vehicle axis A2, e.g., extending between a left side and a right side of the vehicle 20. The vehicle 20 may define a vertical axis A3, e.g., extending between a top and a bottom of the vehicle 20. The longitudinal axis A1, the cross-vehicle axis A2, and the vertical axis A3 may be perpendicular to each other. The front, rear, left and right sides, top, bottom, etc., may be relative to an orientation of an occupant of the vehicle 20. The front, rear, left and right sides, top, bottom, etc., may be relative to an orientation of controls for operating the vehicle 20, e.g., an instrument panel. The front, rear, left and right sides, top, bottom, etc., may be relative to a driving direction of the vehicle 20 when wheels of the vehicle 20 are all parallel with each other.

The vehicle 20 may define a passenger cabin 34 to house occupants of the vehicle 20. The passenger cabin 34 may be between the floor 22 and the roof 26.

Figure 2:
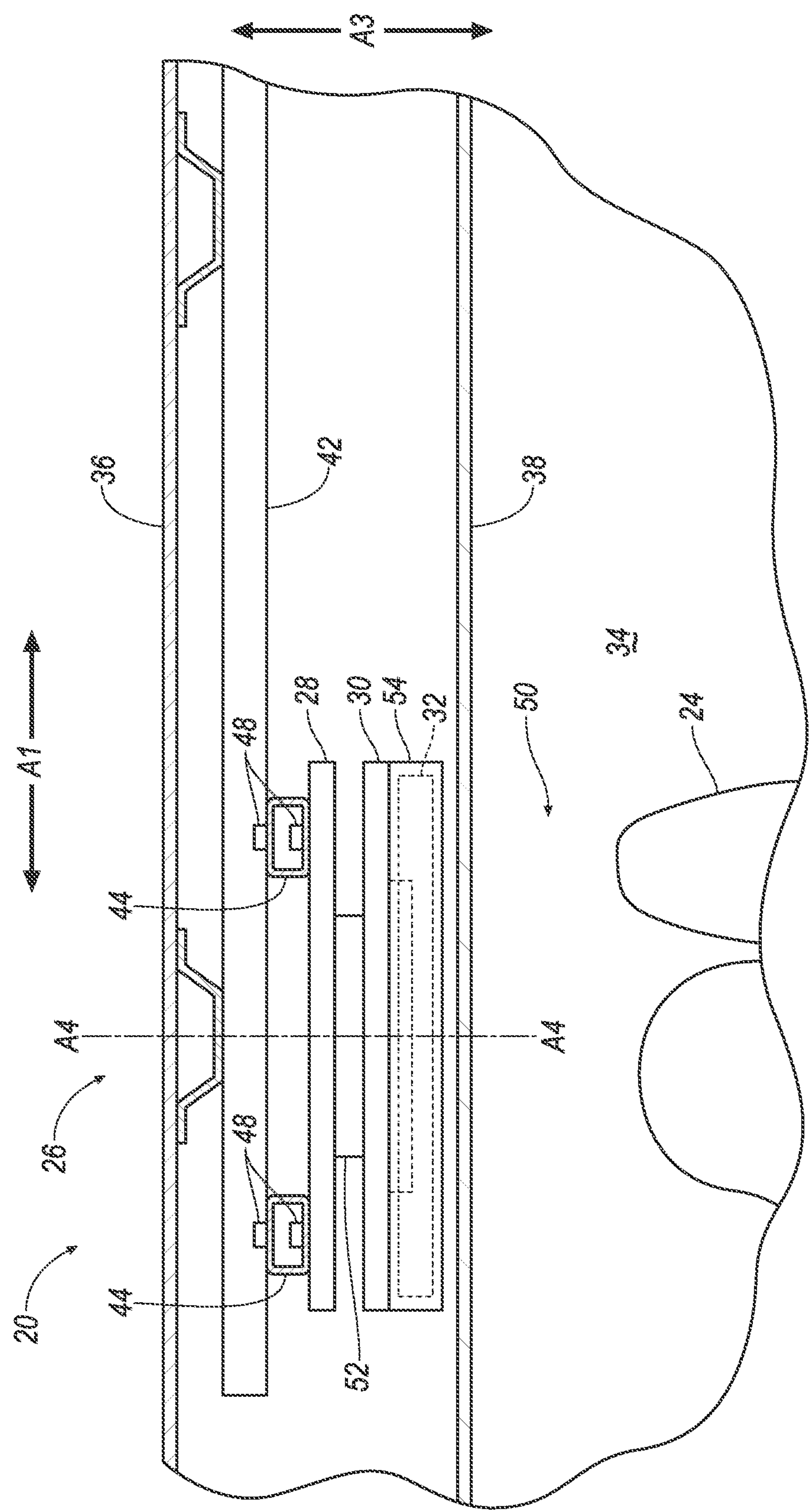
FIG. 2 is a cross section of a roof of the vehicle having the airbags in the uninflated positions.

With reference to FIG. 2, The roof 26 may include an exterior panel 36 and a headliner 38. The headliner 38 and the exterior panel 36 may each provide a class-A surface e, i.e., a surface specifically manufactured to have a high-quality, finished aesthetic appearance free of blemishes. The roof 26 may include one or more support beams 40. The support beams 40 may extend along the longitudinal axis A1 and/or the cross-vehicle axis A2. The support beams 40 may be between the exterior panel 36 and the headliner 38.

As shown throughout FIGS. 1-4, the roof 26 may include one or more tracks 42, 44. One or more of the tracks 42 may be elongated along the longitudinal axis A1. One or more of the tracks 44 may be elongated along the cross-vehicle axis A2 axis. The tracks 42, 44 may be between the exterior panel 36 and the headliner 38. The tracks 42, 44 may be supported by the support beams 40. For example, the tracks 42 elongated along the longitudinal axis A1 may be fixed to the support beams 40, e.g., with a fastener, etc. One or more of the tracks 42, 44 may be supported by one or more other tracks 42, 44. For example, the tracks 44 elongated along the cross-vehicle axis A2 may be supported by the tracks 42 elongated along longitudinal axis A1. The tracks 44 elongated along the cross-vehicle axis A2 may be slidably supported by the tracks 42 elongated along the longitudinal axis A1, e.g., such that tracks 44 elongated along the cross-vehicle axis A2 may translate along the longitudinal axis A1. For example, the tracks 42 elongated along the longitudinal axis A1 may define guides and the tracks 44 elongated along the cross-vehicle axis A2 may include rollers that are designed to roll along the guides.

The seats 24 shown in FIGS. 1-4 are bucket seats, but alternatively the seats 24 may be a bench seat or another type of seat. Each seat 24 may include a seat back, a seat bottom, and a head restraint. The head restraint may be supported by the seat back and may be stationary or movable relative to the seat back. The seat back may be supported by the seat bottom and may be stationary or movable relative to the seat bottom. The seat back, the seat bottom, and/or the head restraint may be adjustable in multiple degrees of freedom. Specifically, the seat back, the seat bottom, and/or the head restraint may themselves be adjustable, in other words, adjustable components within the seat back, the seat bottom, and/or the head restraint, and/or may be adjustable relative to each other.

Each seat 24 is supported by the floor 22. Each seat 24 may be translatable relative to the floor 22, e.g., along the longitudinal axis A1 and/or the cross-vehicle axis A2. For example, each seat 24 may be slidably supported by a track fixed to floor 22. Each seat 24 may be rotatable relative to the floor 22. For example, each seat 24 may be supported by a pivotable base supported by the floor 22, supported by the track fixed to the floor 22, etc. Each seat 24 may pivot along an axis that is parallel to the vertical axis A3, e.g., enabling an occupant of such seat 24 to pivot the seat 24 to face the front, the rear, the right side, or the left side of the vehicle 20.

The bases 28, 30 are supported by the roof 26 and movable relative to the roof 26. For example, one or more first bases 28 may be supported by the tracks 42 elongated along the longitudinal axis A1 and/or the tracks 44 elongated along the cross-vehicle axis A2, and one more second bases 30 may be supported by the first bases 28.

The bases 28, 30 may be translatable relative to the roof 26. The bases 28, 30 may be movable relative to the roof 26 along the cross-vehicle axis A2 and/or the longitudinal axis A1, e.g., along the tracks 42, 44. For example, the first bases 28 may slide along the tracks 44 elongated along the cross-vehicle axis A2. The first bases 28 and the second bases 30 may translate along the longitudinal axis A1, e.g., the bases 28, 30 supported by one or more tracks 44 elongated along the cross-vehicle axis A2 may translate as such tracks 44 are moved along the tracks 42 elongated along the longitudinal axis A1.

One or more actuators 48, e.g., hydraulic type, lead-screw type, rack-and-pinion type, etc., may be designed to move the bases 28, 30 along the longitudinal axis A1 and/or the cross-vehicle axis A2, e.g., in response to an instruction from a computer 68. For example, one or more actuators 48 may be designed to move the tracks 44 elongated along the cross-vehicle axis A2 along the tracks 42 elongated along the longitudinal axis A1, e.g., by fixing one end of such actuator 48 to one of the tracks 42 and another end to one of the tracks 44. As another example, one or more other actuators 48 may move the bases 28 along the tracks 44, e.g., by fixing one end of such actuator 48 to one of the tracks 44 and another end to one of the bases 28, 30. Other designs than the example shown in the Figures may be used to move one or more of the bases 28, 30 relative to the roof 26, e.g., one or more of the bases 28, 30 may slide along the tracks 42 elongated along the longitudinal axis A1, the tracks 42 elongated along the longitudinal axis A1 may slide along the tracks 44 elongated along the cross-vehicle axis A2, etc.

One or more of the bases 28, 30 may be rotatable relative to the roof 26. For example, the second bases 30 may be rotatably supported by the first bases 28. The second bases 30 may each rotate about an axis A4 (shown in FIG. 2) that is parallel to the vertical axis A3.

The bases 28, 30 may be spaced from the seats 24. For example, the bases 28, 30 may be spaced from the seats 24 along the vertical axis A3. In other words, the bases 28, 30 may be above the seats 24 and define a gap 50 therebetween.

The vehicle 20 may include one or more motors 52 supported by the roof 26 and designed to rotate the airbags 32, 132 relative to the roof 26. For example, each motor 52 may be fixed to one of the first bases 28, e.g., via a fastener, etc., and connected to one of the second bases 30, e.g., via gears, belts, pulleys, etc., such that torque generated by the motor 52 causes rotation of the second base 30 relative to the first base 28. Each motor 52 may be an electric motor, a brushed motor, a brushless motor, a servo motor, etc.

One or more airbags 32, 132 are supported by the bases 28, 30. For example, one or more airbags 32, 132 may be supported by each second base 30, e.g., via one or more housings 54 fixed to the second bases 30.

The airbags 32, 132 may be formed of a woven polymer or any other material. As one example, the airbags 32, 132 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 3:
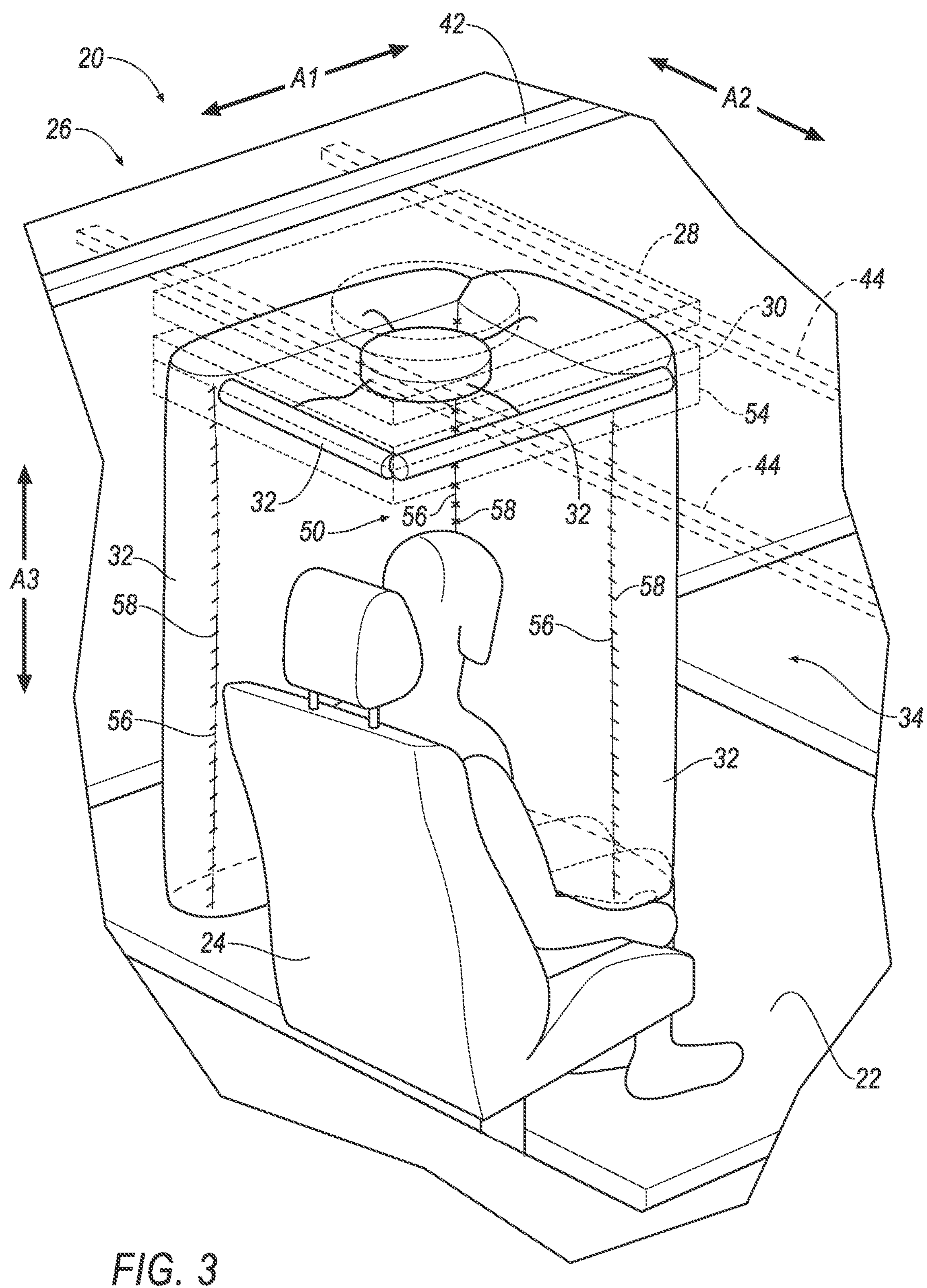
FIG. 3 is a perspective view of a portion the vehicle having some of the airbags in the uninflated positions and other of the airbags in inflated positions.
Figure 4:
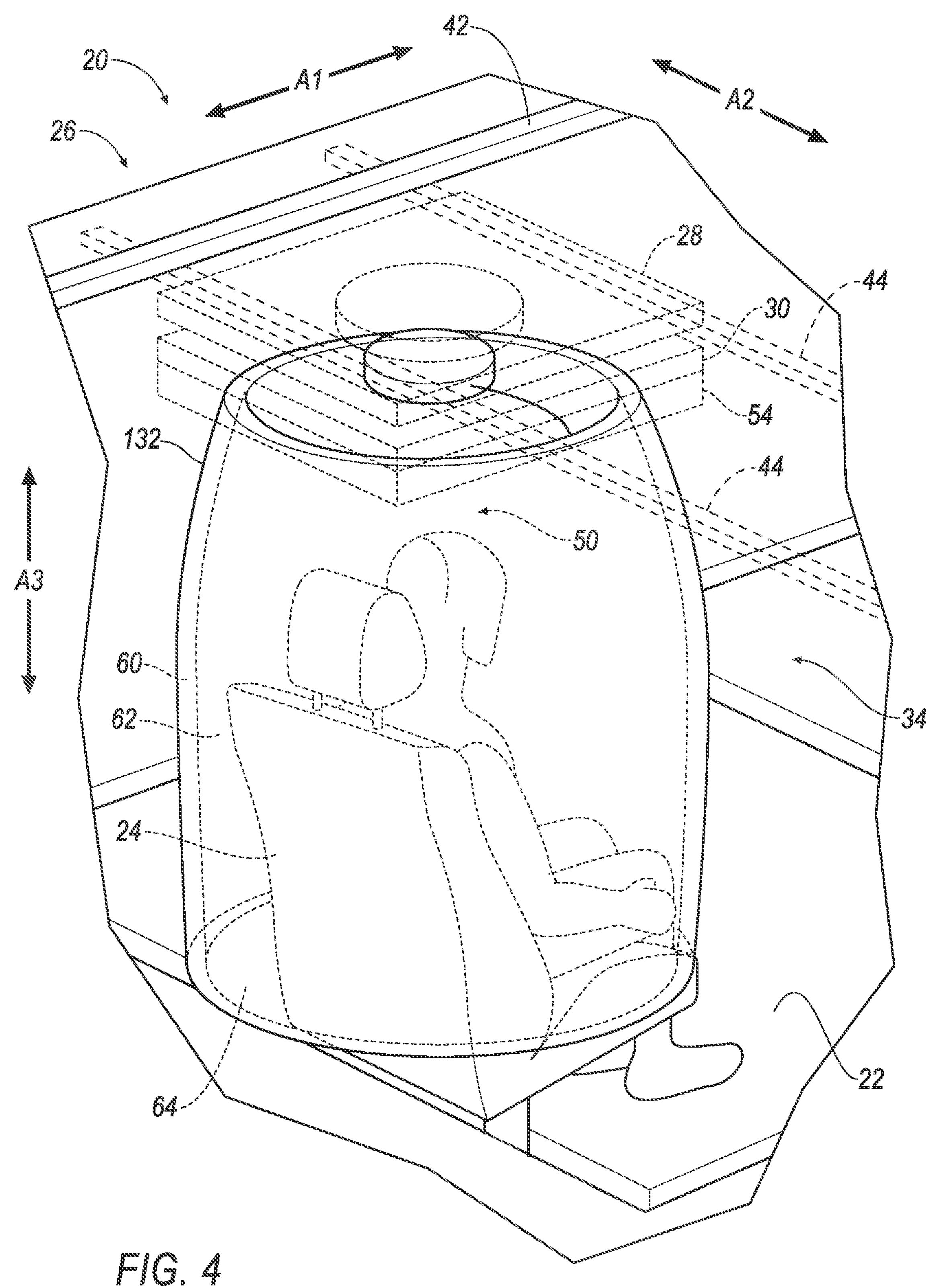
FIG. 4 is a perspective view of a portion the vehicle having another embodiment of the airbag in an inflated position.

The airbags 32, 132 are each inflatable from uninflated positions, shown in FIGS. 1 and 2, to inflated positions, shown in FIGS. 3 and 4. The airbags 32, 132 in the uninflated positions may be between the exterior panel 36 and the headliner 38. Upon inflation, the airbags 32, 132 may tear, rupture, separate, etc., the headliner 38 to move to the inflated positions. The airbags 32, 132 in the inflated positions extend from the roof 26 toward the seat 24. In other words, the airbags 32, 132 in the inflated positions extend downward from the roof 26 toward the floor 22.

With reference to the example embodiment shown in FIG. 3, one airbag 32 may be releasably fixed to another airbag 32. Such airbags 32 may be supported the same base 28, 30. For example, two or more airbags 32 may be supported by one of the second bases 30 may be releasably fixed to each other along a vertically extending side edge 56 of the airbags 32 in the inflated positions. For example, break-away stitching 58 may be used to fix the vertically extending side edge 56 of one airbag 32 to a vertically extending side edge 56 of another airbag 32, etc. The break-away stitching 58 secures airbags 32 adjacent each other in the inflated positions to each other, e.g., inhibiting an occupant of the passenger cabin 34 from passing between such airbags 32 during a vehicle impact. The break-away stitching 58 (or other structure for releasably fixing the airbags 32 to each other, such as adhesive having a certain strength, perforated panels, etc.) may cease fixing adjacent airbags 32 to each other, e.g., by breaking, when one of such airbags 32 is inflated and not the other airbag 32. To put it another way, relative moment between adjacent airbags 32 caused by inflation of one of such airbags 32, and not the other of such airbags 32, may release such airbags 32 from being fixed to each other.

With reference to the example embodiment shown in FIG. 4, at least one of the airbags 132 in the inflated position may surround the one of seats 24. Surrounding the seat 24 provides omni-directional kinematic control of an occupant of such seat 24 during a vehicle impact. For example, such airbag 132 in the inflated position may be cylindrical. The cylinder may include a chamber 60 that receives inflation medium and that surrounds a passage 62 having an open bottom 64. As the airbag 132 inflates to the inflated position, the seat 24 and occupant therein may pass through the open bottom 64 such that the seat 24 and the occupant therein are within the passage 62 of the cylinder.

The housings 54 provide a reaction surfaces for the airbags 32, 132 in the inflated positions. The housings 54 may be supported by the roof 26, the bases 28, 30, etc. The housings 54 may be formed of any material, e.g., a rigid polymer, a metal, a composite, etc.

Figure 5:
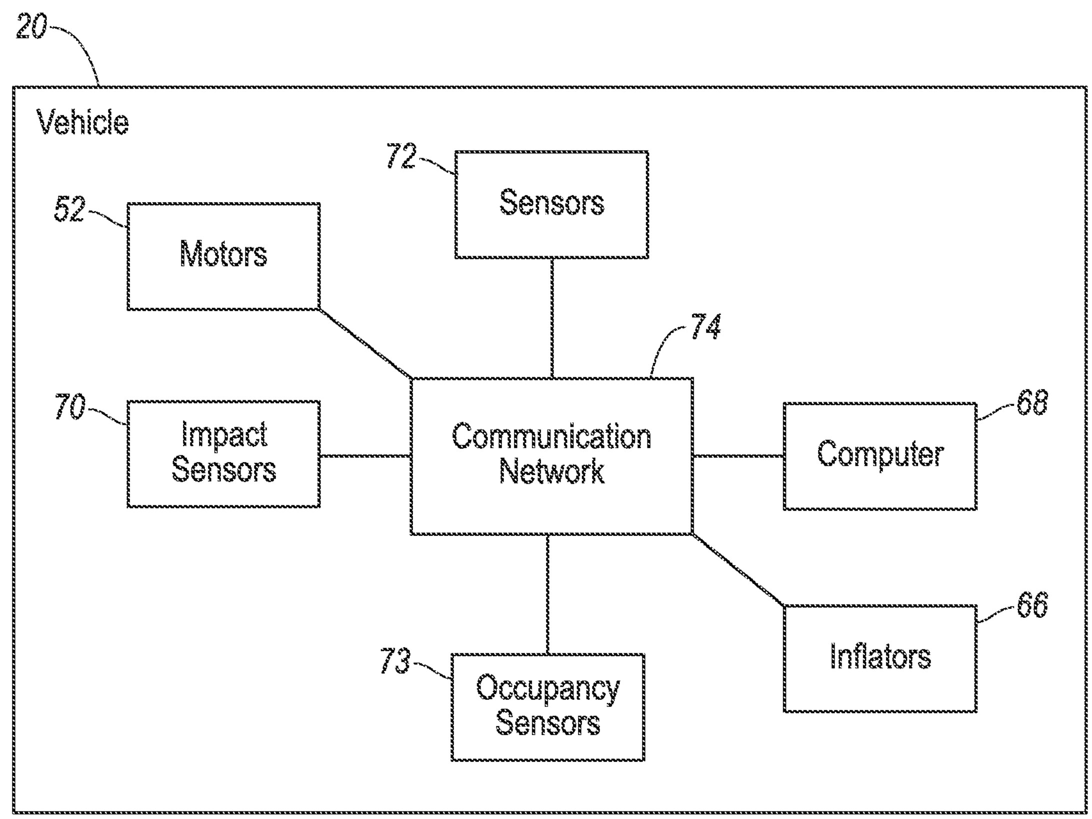
FIG. 5 is a block diagram of components of the vehicle.

With reference to FIG. 5, the vehicle 20 may include one or more inflators 66 for inflating the airbags 32, 132. The inflators 66 may be supported by the bases 28, 30. For example, the inflators 66 and may be disposed in the housings 54. The inflators 66 may be connected to the airbags 32, 132. Upon receiving a signal from, e.g., the computer 68, the inflators 66 may inflate the airbags 32, 132 with an inflatable medium, such as a gas. The inflators 66 may be, for example, pyrotechnic inflators that uses a chemical reaction to drive inflation medium to the airbags 32, 132. The inflators 66 may be of any suitable type, for example, cold-gas inflators.

The vehicle 20 may include an impact sensor 70. The impact sensor 70 may be in communication with the computer 68. The impact sensor 70 is programmed to detect an impact to the vehicle 20. The impact sensor 70 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 70 may be located at numerous points in or on the vehicle 20

The vehicle 20 may include one or more sensors 72 designed to detect a position of the seats 24 and a position of the bases 28, 30. For example, the sensors 72 may be proximity sensors, contact switches, rotational position sensors, etc. The sensors 72 may be supported by the seats 24, the floor 22, the roof 26, the bases 28, 30, etc.

The vehicle 20 may include an occupancy sensor 73 programmed to detect occupancy of the seat(s) 24. The occupancy sensor 73 may be visible-light or infrared cameras directed at the seat, weight sensors the rear seat, sensors detecting whether a seat belt for the seat is buckled or unspooled, or other suitable sensors.

The vehicle 20 may include a communication network 74. The communication network 74 includes hardware, such as a communication bus, for facilitating communication among components of the vehicle 20, e.g., the computer 68, the impact sensor 70, the inflators 66, the sensors 72, the occupancy sensor 73, etc. The communication network 74 may facilitate wired or wireless communication among the components in accordance with a number of communication protocols such as controller area network (CAN), Ethernet, WiFi, Local Interconnect Network (LIN), and/or other wired or wireless mechanisms.

The computer 68 may be a microprocessor-based computing device implemented via circuits, chips, or other electronic components. For example, the computer 68 may include a processor, memory, etc. The memory of the computer 68 may include memory for storing instructions executable by the processor as well as for electronically storing data and/or databases. Although one computer 68 is shown in FIG. 5 for ease of illustration, it is to be understood that the computer 68 could include, and various operations described herein could be carried out by, one or more computing devices.

The memory may store instruction executable by the processor to identify a position of one or more of the seats 24. The position of each seat 24 may be a translational position, e.g., relative to the longitudinal axis A1 and cross-vehicle axis A2. For example, the position of one of the seats 24 may be a distance of such seat 24 from the front and/or the rear of the vehicle 20, and a distance of such seat 24 from the right-side and/or left side of the vehicle 20. The position for each seat 24 may be a rotational position, e.g., about the vertical axis A3 and relative to the front, rear, right side, and/or left side of the vehicle 20. For example, the position of one of the seats 24 may be an amount and direction of rotation of the seat 24 from facing toward the front of the vehicle 20, e.g., 135 degrees clockwise. The position of each seat 24 may be identified by the computer 68 based on information from the sensors 72, e.g., received via communication network 74 and indicating the translational and/or rotational position of one or more of the seats 24.

The memory may store instructions executable by the processor to move at least one of the bases 28, 30 based on at least one of the position of the one of seats 24 or the position of an occupant of such seat 24. The computer 68 may identify the position of the seat(s) 24 based on information from the sensors 72. The computer 68 may identify the position of occupant(s) of such seat(s) 24 based on information from the occupancy sensor 73. The computer 68 may instruct the actuator 48, e.g., via the communication network 74, to translate the first bases 28 relative to the roof 26. As another example, the computer 68 may instruct the motor 52 to rotate the second base 30 relative to the roof 26. The computer 68 may translate and/or rotate one or more of the first bases 28 and/or the second bases 30 based on the translational position and/or rotational position of the respective seat(s) 24 and/or occupant(s) therein. The computer 68 may translate and/or rotate the first bases 28 and/or the second bases 30 such that one or more of the airbags 32, 132 remains positioned relative to the respective seat(s) 24 and/or occupant(s) therein to control kinematics of such occupant(s). For example, the computer 68 may move the bases 28, 30 forward when the respective seat 24 is moved forward. As another example, the computer 68 may move the bases 28, 30 toward the right side of the vehicle 20 when and/or occupant in the seat 24 is moves toward the right side of the vehicle 20. As another example, the computer 68 may rotate the second base 30 clockwise when the respective seat 24 is rotated clockwise. As one more example, the computer 68 may store in the memory a look-up table or the like associating various translational and rotational positions of the seats 24 and/or occupant(s) therein with translational and or rotational positions of the bases 28, 30. The computer 68 may detect translational and rotational positions of the bases 28, 30, e.g., for use in closed loop positioning of the bases 28, 30 to their commanded positions above the respective seats 24. Alternatively and/or additionally the computer 68 may move the bases 28, 30 based on receiving an instruction from the occupant. For example, vehicle controls designed to move the seats 24 may also move the bases 28, 30.

During normal vehicle operation the computer 68 may continuously, at time intervals, e.g., every 500 milliseconds, etc., identify the rotational and/or translational positions of the seats 24 and/or occupant(s) therein, e.g., based on information received from the sensors 72, the occupancy sensors 73, etc. The computer 68 may then move the bases 28, 30 based on the identified rotational and/or translational positions of the seats 24 and/or occupant(s) therein, e.g., by sending commands to the actuators 48, the motors 52, etc.

In the event of an impact, the impact sensor 70 may detect the impact and transmit a signal through the communication network 74 to the computer 68. The computer 68 may transmit a signal through the communication network 74 to one or more of the inflators 66. The computer 68 may selectively transmit the signal, e.g., to some inflators 66 and not others, e.g., based on a detected direction of the impact to the vehicle 20. The inflators 66 may discharge and inflate the airbags 32, 132.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:

a floor;

a seat supported by the floor;

a roof;

a base supported by the roof and movable relative to the roof; and an airbag supported by the base.

2. The vehicle of claim 1, wherein the roof includes an exterior panel and a headliner, the airbag between the exterior panel and the headliner in an uninflated position.

3. The vehicle of claim 1, wherein the roof includes a track elongated along an axis, the base movable along the track.

4. The vehicle of claim 3, further comprising a second base supported by the roof and movable relative to the roof and the base, and a second airbag supported by the second base.

5. The vehicle of claim 1, wherein the base is rotatable relative to the roof.

6. The vehicle of claim 5, wherein the base is translatable relative to the roof.

7. The vehicle of claim 1, wherein the base is movable relative to the roof along a cross-vehicle axis.

8. The vehicle of claim 1, wherein the base is movable relative to the roof along a vehicle-longitudinal axis.

9. The vehicle of claim 1, further comprising a second airbag supported by the base.

10. The vehicle of claim 9, wherein the airbag is releasably fixed to the second airbag.

11. The vehicle of claim 1, wherein the airbag is inflatable to an inflated position surrounding the seat.

12. The vehicle of claim 11, wherein the airbag in the inflated position is cylindrical.

13. The vehicle of claim 1, further comprising an actuator supported by the roof and designed to move the base.

14. The vehicle of claim 1, further comprising an inflator supported by the base.

15. The vehicle of claim 1, further comprising a processor and a memory storing instructions executable by the processor to move the base based on at least one of a position of the seat or a position of an occupant of the seat.

16. The vehicle of claim 1, wherein the seat is rotatable relative to the floor and the base is rotatable relative to the roof.

17. The vehicle of claim 16, further comprising a processor and a memory storing instructions executable by the processor to rotate the base based on a rotational position of the seat.

18. The vehicle of claim 1, further comprising a motor supported by the roof and designed to rotate the airbag relative to the roof.

19. The vehicle of claim 1, wherein the airbag is inflatable to an inflated position that extends from the roof toward the seat.

20. The vehicle of claim 1, wherein the base is spaced from the seat.

* * * * *